United States Patent
Amos et al.

(10) Patent No.: US 7,499,423 B1
(45) Date of Patent: Mar. 3, 2009

(54) SYSTEM AND METHOD FOR CLOCK DISTRIBUTION AND SYNCHRONIZATION AND RADIO LOCATION

(75) Inventors: James A. Amos, North Canton, OH (US); Clark Carty, Brunswick, OH (US)

(73) Assignee: Cisco Technology, Inc. (US)

( * ) Notice: Subject to any disclaimer, the term of this patent is extended or adjusted under 35 U.S.C. 154(b) by 911 days.

(21) Appl. No.: 10/865,545

(22) Filed: Jun. 10, 2004

(51) Int. Cl.
*H04B 7/212* (2006.01)

(52) U.S. Cl. .................. 370/324; 370/503; 370/507; 370/509; 370/512; 324/387; 455/456; 455/404

(58) Field of Classification Search ............. 370/324, 370/503, 507, 509, 512, 520; 342/387; 455/456, 455/404, 522, 425, 41.2
See application file for complete search history.

(56) References Cited

U.S. PATENT DOCUMENTS

| | | | |
|---|---|---|---|
| 5,987,062 A * | 11/1999 | Engwer et al. ............. 375/225 |
| 6,356,608 B1 * | 3/2002 | Atarius ....................... 375/362 |
| 6,412,018 B1 * | 6/2002 | Tuel, Jr. ...................... 719/313 |
| 6,414,635 B1 * | 7/2002 | Stewart et al. .............. 342/457 |
| 6,560,462 B1 * | 5/2003 | Ravi et al. ................ 455/456.1 |
| 6,618,005 B2 * | 9/2003 | Hannah et al. ........... 342/357.1 |
| 6,727,790 B2 * | 4/2004 | Raphaeli et al. ............. 375/363 |
| 6,754,488 B1 * | 6/2004 | Won et al. ................... 455/424 |
| 6,879,838 B2 * | 4/2005 | Rankin et al. ............ 455/456.6 |
| 2002/0089967 A1 * | 7/2002 | Brajal et al. ................ 370/347 |
| 2003/0001776 A1 * | 1/2003 | Hannah et al. .............. 342/387 |
| 2003/0137453 A1 * | 7/2003 | Hannah et al. .............. 342/387 |
| 2004/0080323 A1 * | 4/2004 | Bostoen et al. ............. 324/624 |

* cited by examiner

*Primary Examiner*—Minh D Dao
(74) *Attorney, Agent, or Firm*—Tucker Ellis & West LLP

(57) ABSTRACT

A system for locating a client in a wireless network. The system includes at least three access points. Each access point is adapted to wirelessly communicate with a client having a location using packeted data, be placed in wired data communication within a selected data network; and to share a common precise time reference using the selected data network. The system further includes a switch adapted to translate the relative position of the access points based on a shared common precise time reference and to calculate the location of the client based on a transmission from the client.

21 Claims, 6 Drawing Sheets

SYSTEM AND METHOD FOR CLOCK DISTRIBUTION AND SYNCHRONIZATION AND RADIO LOCATION

BACKGROUND OF THE INVENTION

The present invention relates generally to wireless networks and more particularly to a system and method for accurately locating a client among access points in a wireless network.

Wireless networks in accordance with the IEEE 802.11 and 802.3 standards typically make no use of access point location information. For example, one pulse measure technique, referred to as time domain reflectometry, for use in cable and connection testing in association with Gigabit Ethernet physical interface cards has been documented. However, time domain reflectometry is merely used to measure cable length, or to measure the cable length to a cable break. No attempt is made to locate access points or to use the length information to distribute a synchronized clock through the network.

Time difference of arrival techniques are generally known for locating a radio in a wireless network. Time difference of arrival techniques require at least three receive points in the network to locate a radio. Moreover, to accurately locate a radio in a network using a time difference of arrival technique, two additional requirements must also be met. The first requirement is that the relative locations of the access points must known, and the second requirement is that a common, precise time reference must be shared by the access points. These two additional requirements follow for a wireless local area network.

Once the relative locations are known and a time reference is shared, the following procedure allows for locating a radio or a client. First, the client for which the location is desired transmits a packet. Each access point receives and records the packet, time stamping the packet using the time reference. Each recorded packet is then post processed to identify precisely when the packet arrived with respect to the start of the record. The offset of the arrival, plus the time stamp, is when the packet arrived at a respective access point. The arrival times for each access point are then compared with the access point locations, and the location of the client that transmitted the packet is calculated using known algorithms relating to a circle.

Unfortunately, wireless networks in accordance with the IEEE 802.11 and 802.3 standards typically lack sufficient clock correlation in the switch and the access points to allow for accurately locating a client. For example, network time protocols or simple network time protocols generally allow for a variation of 1 microsecond (µsec) in timing. 1 sec translates to propagation distance of approximately 983 feet (ft.), or the variation or degree of accuracy one can expect in the location of a client should such a protocol be used to locate a client. Thus, 1 sec of variation in the synchronization of network entities is too long a period of time to allow for accurately locating a client in a wireless network.

One approach to locating a radio in a wireless network is to make use of received signal strength indicator information. Generally, switches and access points have and use received signal strength indicator signals. Received signal strength indicator signals are voltage signals indicative of received signal strength or power, and are commonly used to control gain. Received signal strength indicator information is also generally available over the network.

However, the use of received signal strength indicator information does not allow for accurately locating a client in a wireless network. For example, the output power of client radios is known to vary substantially from one radio to the next. Variations of decibels (dB), or half the output power, are not uncommon. Thus, two radios in the same location having different output powers results in two different received signal strength indicator voltages. Consequently, two different locations for each client are arrived at, even though the radios are located in the same place. Therefore, due to radio output power variations, received signal strength indicator information does not allow for accurately locating a client in a wireless network.

Thus, there exists a need for distributing a precise time reference to network entities in a wireless network. Moreover, there exists a need for a system and method for locating a client in a wireless network.

SUMMARY OF THE INVENTION

The present invention provides a system and method for locating a client in a wireless network. The present innovation also provides distributing a precise time reference to network entities in a wireless network.

In accordance with the present invention there is disclosed a method for synchronizing clocks in a wireless network. The method includes determining the distance from a clock source, receiving a time synchronization packet having a time stamp indicative of the time the packet was sent, and adjusting a clock based on the time synchronization packet and the distance from the clock source.

Further in accordance with the present invention there is disclosed a method for determining location in a wireless network having at least three access points. The method includes determining the relative position of at least three access points in the network and distributing a clock to synchronize clocking in the access points. The method further includes receiving a packet from a client at each of the three access points, oversampling a correlation of the packet at each access point, and obtaining a correlation peak for the packet at each access point. The relative positions of the access points are then adjusted using the correlation peaks, and represent three coplanar points.

Further yet in accordance with the present invention, there is disclosed a system for locating a client in a wireless network. The system includes at least three access points. Each access point is adapted wirelessly communicate with a client having a location using packeted data, be placed in wired data communication within a selected data network, and to share a common precise time reference using the selected data network. The system further includes a switch adapted to translate the relative position of the three access points based on a shared common precise time reference and to calculate the location of the client based on a transmission from the client.

In one aspect of the present system, an Ethernet switch includes a precision clock. The precision clock is electrically coupled to physical interface cards in the switch. This is so that a single clock is used to generate all of the packets sent to and from the switch, giving the packets a common base frequency. This also so that all packets being sent to and from the switch are based on a common clock.

In another aspect of the present system, a physical interface cards includes time domain reflectometry circuitry. Time domain reflectometry circuitry is used to determine the length of cable between a physical interface card and an associated access point.

In yet another aspect of the present system, a high frequency clock is used to increase location accuracy, and in another aspect of the present invention, a periodic timing synchronization pulse packet is used for sharing a common precise time reference. In accordance with another aspect, the present invention oversamples the correlation of the packets.

In accordance with another aspect of the present invention, a time difference of arrival technique is used to calculate the location of a radio or client in the wireless network.

By virtue of the foregoing, there is thus provided a system and method for locating a client in a wireless network. Moreover, a precise time reference is distributed to network entities in a wireless network.

These and other objects and advantages of the present invention will become readily apparent to those skilled in this art from the following description wherein there is shown and described a preferred embodiment of this invention, simply by way of illustration of one of the best modes suited for to carry out the invention. As it will be realized, the invention is capable of other different embodiments and its several details are capable of modifications in various obvious aspects all without departing from the spirit of the present invention. Accordingly, the drawing and descriptions will be regarded as illustrative in nature and not as restrictive.

BRIEF DESCRIPTION OF THE DRAWINGS

The accompanying drawings, which are incorporated in and constitute a part of this specification, illustrate embodiments of the present invention and, together with a general description of the invention given above, and the detailed description given below, serve to explain the principles of the present invention.

DETAILED DESCRIPTION OF THE DRAWINGS

Figure 1:
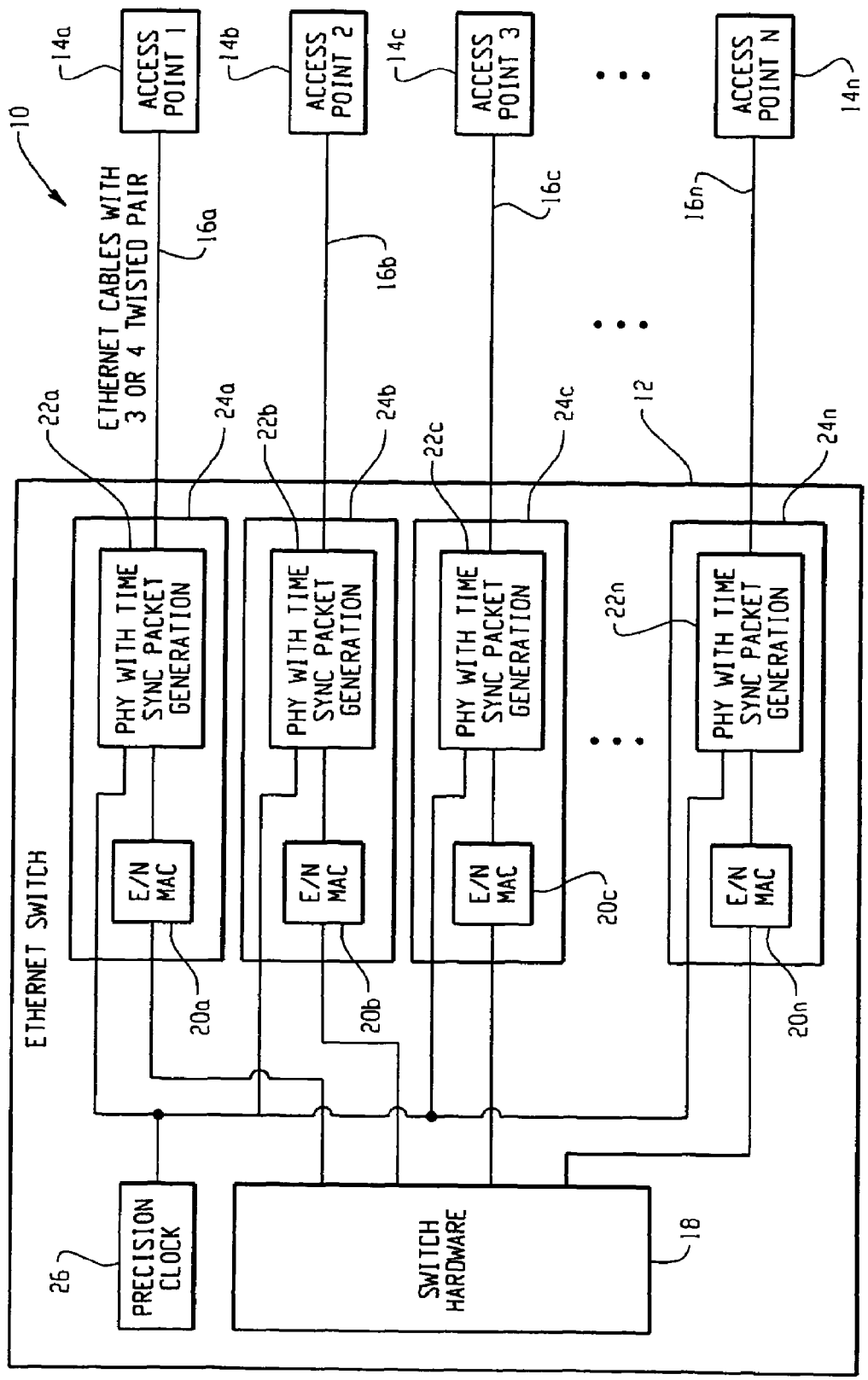
FIG. 1 is a block diagram of an embodiment of a coherent clock system in accordance with principles of the present invention.

With reference to FIG. 1, there is shown one embodiment 10 of a coherent clock system in accordance with principles of the present invention. Coherent clock system 10 is advantageously an integral part of an Ethernet based wireless local area network, and allows users or clients of the network to communicate using packeted data. However, it will be appreciated by those of ordinary skill in the art that although coherent clock system 10 is described in terms of an Ethernet network, coherent clock system 10 applies equally well to other types of wireless networks.

Coherent clock system 10 is defined by Ethernet switch 12 and at least three access points 14a-c. An unlimited number of additional access points can also be included and is represented by the letter "N" at reference numeral 14n. As also shown, access points 14a-n are coupled to Ethernet switch 12 through respective Ethernet cables 16a-n. Ethernet cables 16a-n can be category five (CAT-5) cables that contain three or four twisted pairs of conductors.

Ethernet switch 12 includes switch hardware 18 that functions to provide connectivity between clients of the wireless network using packeted data. Ethernet switch 12 further includes a number of respective Ethernet media access cards 20a-n and a number of respective physical interface cards 22a-n for access points 14a-n. Physical interface cards 22a-n include time sync packet generation as will be described hereinafter.

In this embodiment 10, Ethernet media access cards 20a-n and physical interface cards 22a-n are constructed on the same substrate or circuit board as indicated at reference numerals 24a-n. In other embodiments, corresponding Ethernet media access cards 20a-n and physical interface cards 22a-n can be constructed on separate respective circuit boards.

As also shown, physical interface cards 22a-n are electrically coupled to access points 14a-n and Ethernet media access cards 20a-n, respectively. Ethernet media access cards 20a-n are also electrically coupled to switch hardware 18. Thus, coherent clock system 10 appears similar to a standard 802.3 wireless network.

However, in contrast to a standard 802.3 wireless network and in accordance with an aspect of the present invention, Ethernet switch 12 further includes a precision clock 26. The term "precision clock" as used herein refers to a clock that allows location of a radio in a wireless network to a desired accuracy. Precision clock 26 is electrically coupled to each physical interface card 20a-n in Ethernet switch 12. This is so that a single clock, e.g., precision clock 26, can be used to generate packets, giving the packets a common base frequency. This also means that packets being sent to and from Ethernet switch 12 can be based on a common clock or, more specifically, precision clock 26. The distribution of a precision clock will be discussed in more detail hereinafter.

It will be appreciated by those of ordinary skill in the art that the distribution of precision clock 26 is not a requirement. In the alternative, each access point 14a-n could have its own precision clock, the respective clocks being synchronized. However, the distribution of precision clock 26 in the manner described herein helps mitigate costs on access point 14a-n hardware and facilitates the use of existing or legacy access points. Moreover, including a precision clock in a switch allows a manufacturer of switches to provide additional features associated with the use of a common precise time reference shared by network entities in a wireless network, such as accurately locating a client in the network, without requiring a network provider to use any one particular type of access point.

Figure 2:
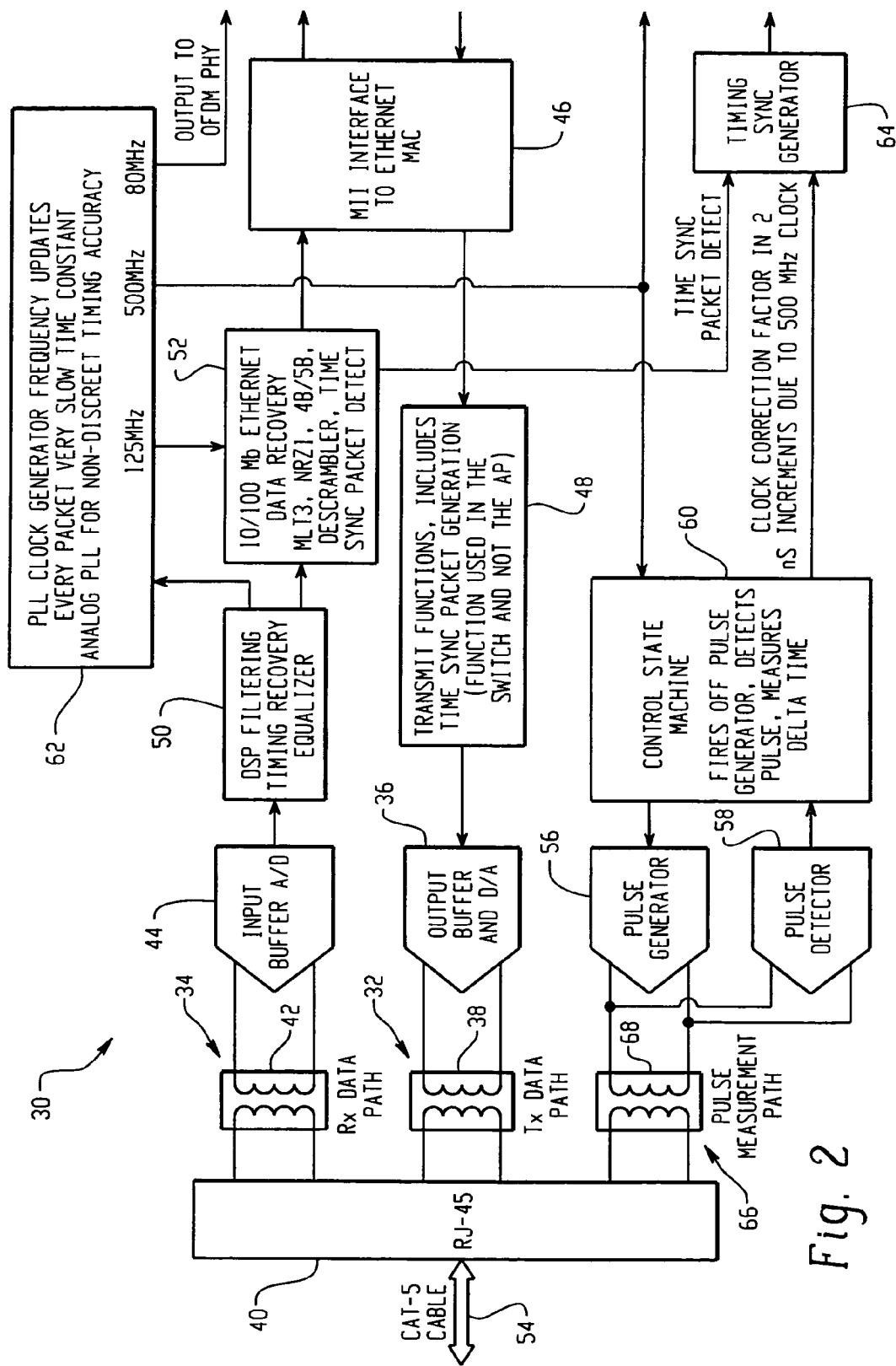
FIG. 2 is a block diagram of an embodiment of an 802.3 Ethernet physical interface card (PHY) in accordance with principles of the present invention.

Referring now to FIG. 2, a block diagram of an embodiment 30 of an IEEE 802.3 Ethernet physical interface card in accordance with principles of the present invention is shown. More specifically, physical interface card 30 includes clock recovery circuitry as will be described hereinafter.

Physical interface card 30 also includes hardware that provides functions typically found in a standard physical interface card. For instance, physical interface card 30 includes a transmit data path 32 and a receive data path 34. More specifically, transmit data path 32 comprises output buffer and digital to analog converter (D/A) 36, transformer 38, and RJ-45 connector 40. Similarly, receive data path 34 comprises RJ-45 connector 40, transformer 42, and input buffer and analog to digital converter (A/D) 44. Transmit data path 32 further includes an interface 46 used for interfacing with an Ethernet media access card and transmit functions 48 including time synchronization packet generation, while receive data path 34 further includes digital signal processing (DSP) filtering 50 including a timing recovery equalizer, Ethernet data recovery, descrambler and synchronization packet detector 52, and interface 46. Transmit and receive data paths 32, 34 make use of twisted pairs of conductors in category five (CAT-5) cable 54, that is coupled to RJ-45 connector 40, and that, in turn, couples to an access point (not shown).

In accordance with other aspects of the present invention, physical interface card 30 includes additional functions over a standard physical interface card, realized through clock recovery circuitry. In accordance with one aspect, clock recovery circuitry includes time domain reflectometry functionality.

To provide time domain reflectometry functionality, clock recovery circuitry generally comprises pulse generator 56, pulse detector 58, and control state machine 60. Pulse generator 56 and pulse detector 58 are electrically coupled to control state machine 60. Control state machine 60 actuates or "fires off" pulse generator 56 and detects pulse measurements in differences of time, e.g., delta time, from pulse detector 58. Control state machine 60 is electrically coupled to phase locked lopped (PLL) clock generator 62 for clocking and time sync generator 64 for synchronization. Digital signal processing filtering 50 including a timing recovery equalizer is also electrically coupled to phase locked lopped (PLL) clock generator 62.

Pulse generator 56 and pulse detector 58 advantageously make use of one of the unused pairs of twisted pairs in cable 54. Thus, pulse measurement path 66 comprises transformer 68, RJ-45 connector 40, and cable 54. The unterminated nature of the unused pair allows a pulse to be sent down the cable and reflected back, thereby allowing the travel time of the pulse to be measured, as well as the phase delay. The use of unterminated pairs of conductors proximate to an access point further allows the determination of the relative locations of access points in a wireless network.

Those of ordinary skill in the art will appreciate that in other embodiments, terminated pairs of conductors may be used without departing from the spirit of the present invention. Such use depends on the characteristic impedance of the termination at the pulse frequency, and that, if appropriate, a reflection of the pulse will still be achieved despite the termination, thereby allowing measurement.

A standard physical interface card typically utilizes a 125 Megahertz (MHz) phase locked loop for clock generation. However, 125 MHz is too low a frequency for purposes of measuring the pulse trip time down cable 54. For example, in free space, 2 nanoseconds (nS) of delay represents 1 foot (ft.) of distance traveled for radio frequency (RF) energy. In contrast, 125 MHz translates to a distance of approximately 8 ft. Thus, the frequency of the clock used to measure the pulse timing limits the ability to accurately measure client location in a wireless network; and, hence, a much higher frequency clock is generally desirable.

A 500 MHz clock provides client location resolution or accuracy within 1 ft. 1 ft. is generally thought to provide sufficiently accurate location of a client in a WLAN, while striking a compromise in the ease of generating a clock. Thus, for purposes of illustration, a 500 MHz clock will be used, and phase locked loop clock generator 62 includes a phase locked loop that produces a 500 MHz clock. The 500 MHz clock is electrically coupled to control state machine 60, as well as to circuitry external to physical interface card 30.

Those of ordinary skill in the art will appreciate that in other embodiments, higher frequency clocks can be used if desired, and that the present invention is not limited to any particular clock frequency.

Referring to FIGS. 1 and 2, and in accordance with another aspect of the present invention, switch 12 sends out a periodic timing synchronization pulse packet. This pulse packet can be sent on an arbitrary boundary, but is bounded by the size of the high resolution clock registers typically found in an 802.11 physical interface card. These pulse packets are sent and received by the 802.3 physical interface cards, e.g., physical interface cards 22a-n, 30, without intervention from the media access controllers contained in media access cards 20a-n. Given the high reliability of sending packets across an 802.3 network, a unique bit sequence is easily detected by physical interface cards 22a-n, 30. The detection of the unique sequence in this packet will trigger timing synch generator 64. Further, it is this pulse that will be corrected for using the time domain reflectometry technique, thereby providing for globally synchronized timing information across the network.

Figure 3:
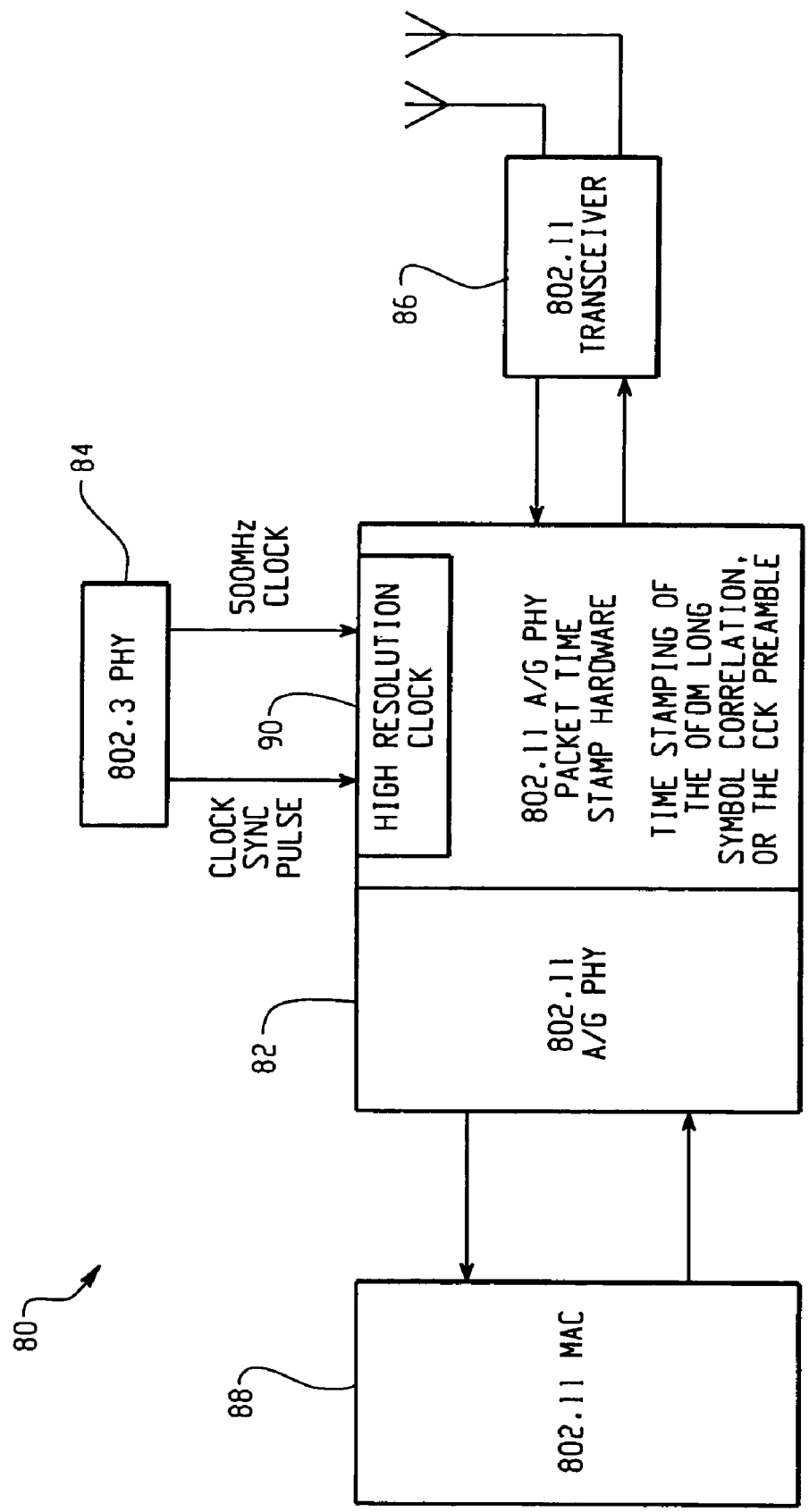
FIG. 3 is block diagram for an embodiment of an access point system in accordance with principles of the present invention

Referring now to FIG. 3, a block diagram for an embodiment 80 of an access point system in accordance with principles of the present invention is shown. More specifically, access point system 80 comprises an 802.11 physical interface card 82 and a 802.3 physical interface card 84. Associated with and electrically coupled to 802.11 physical interface card 82 is an 802.11 transceiver 86 that is used to wireless communicate with clients (not shown). 802.11 A/G physical interface card 82 also electrically couples to an 802.11 media access card 88.

802.11 physical interface card 82 uses a high resolution clock 90, e.g., precision clock 26 shown and described in conjunction with FIG. 2, to mark packets and, in accordance with an aspect of the present invention, oversamples the correlation of the long symbol in those packets.

Typical orthogonal frequency division multiplexing (OFDM) packet correlation is not done at a sufficiently high clock rate to allow for accurately locating a client in a wireless network. For example, if a control state machine in an 802.11 physical interface card runs at 20 MHz, then the correlation peak in the receiver will be on a 20 MHz boundary. A 20 MHz boundary correlates to a location accuracy within approximately 50 ft. However, since a channel is typically sampled at 40 MHz, the correlation of packets processed with a linear interpolator in the 802.11 physical interface card increases the location accuracy and correlates to a location accuracy within approximately 25 ft. Thus, the accuracy of packet correlation using orthogonal frequency division multiplexing and complementary code keying (CCK) waveforms is the limiting factor in accurately locating a client in a wireless network. Therefore, and in accordance with one aspect, the present invention achieves additional location accuracy by additional oversampling of the correlation of the long symbol.

Further, once the position of the correlation peak of the long symbol is found, a time stamp is generated for the packet. This time stamp is then forwarded to the network entity that is responsible for the location calculations, e.g., switch hardware 18 shown in FIG. 1. The time stamp is then used in conjunction with the time stamp from other packets from other access points participating in the location calculation. With this timing information, a location estimation for the source of the packets or the clients can be made.

Figure 4:
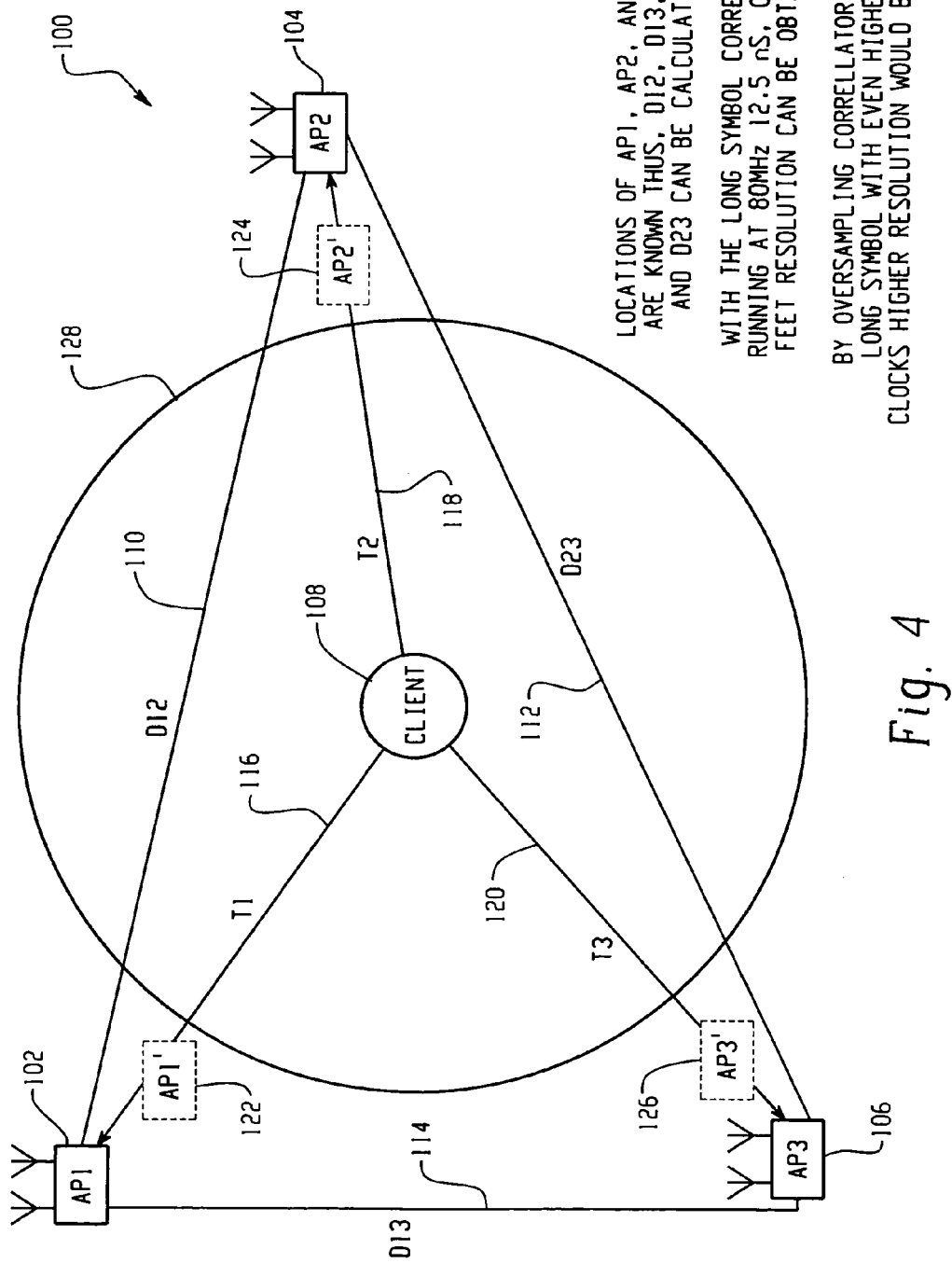
FIG. 4 is a diagram illustrating the use of a time difference of arrival technique with the present invention.

Referring now to FIG. 4, a diagram illustrating the use of a time difference of arrival technique with the present invention is shown. For ease of explanation, wireless network 100 includes three access points 102, 104, 106 which are also denoted as AP1, AP2, and AP3, respectively. Those of ordinary skill in the art will appreciate that additional access points may be used without departing from the spirit of the present invention. AP1 (102), AP2 (104), and AP3 (106) are used to accurately locate radio or client 108.

As previously described, the relative locations of AP1 (102), AP2 (104), and AP3 (106) have been determined. Knowing the relative locations of AP1 (102), AP2 (104), and AP3 (106), the distances between the access points can be calculated. For example, the distance between AP1 (102) and AP2 (104) is indicated at reference numeral 110 and denoted as D12. Similarly, the distances between AP2 (104) and AP3 (106) and AP1 (102) and AP3 (106) are indicated at reference numerals 112 and 114 and denoted as D23 and D13, respectively.

As also previously described, AP1 (102), AP2 (104), and AP3 (106) shared a common, precise time reference. Further, client 108 transmits packeted data, e.g., a long symbol. Based on the shared time reference, the time for the packeted data to reach AP1 (102), AP2 (104), and AP3 (106) is indicated at reference numerals 116, 118, and 120 and denoted by T1, T2, and T3, respectively.

Knowing the relative locations of AP1 (102), AP2 (104), and AP3 (106) and the times Ti (116), T2 (118), T3 (120) for the packeted data to reach each AP1 (102), AP2 (104), AP3 (106), the relative locations of the AP1 (102), AP2 (104), and AP3 (106) are adjusted or translated based on the differences in times T1 (116), T2 (118), T3 (120). Such translations are shown in dashed line at reference numerals 122, 124, and 126 and denoted as AP1', AP2', and AP3', respectively.

Once the relative locations of AP1 (102), AP2 (104), and AP3 (106) have been translated, AP1' (122), AP2' (124), and AP3' (126) represent three coplanar points. These three points define a circle 128. The equation describing circle 128 has a center which coincides with the relative location of client 108.

Figure 5:
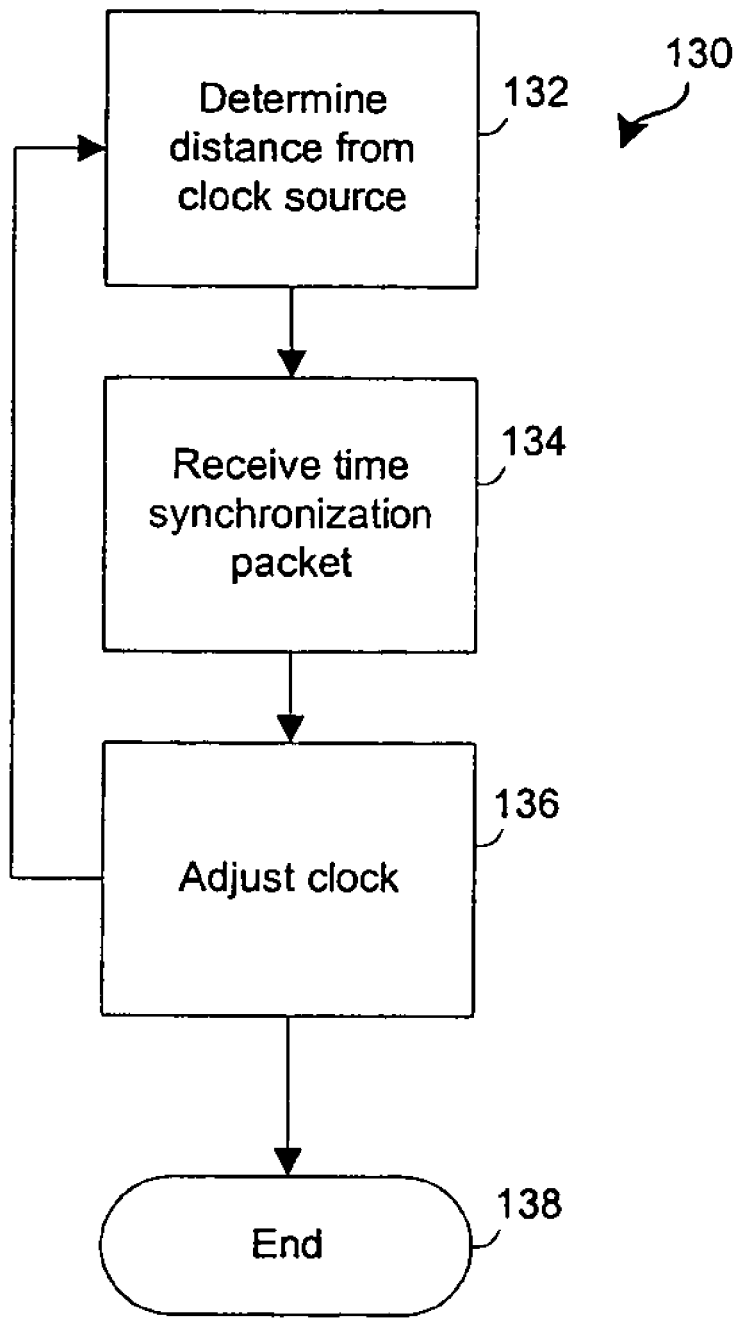
FIG. 5 is a flowchart illustrating the program flow of a method for synchronizing clocks in a wireless network.
Figure 6:
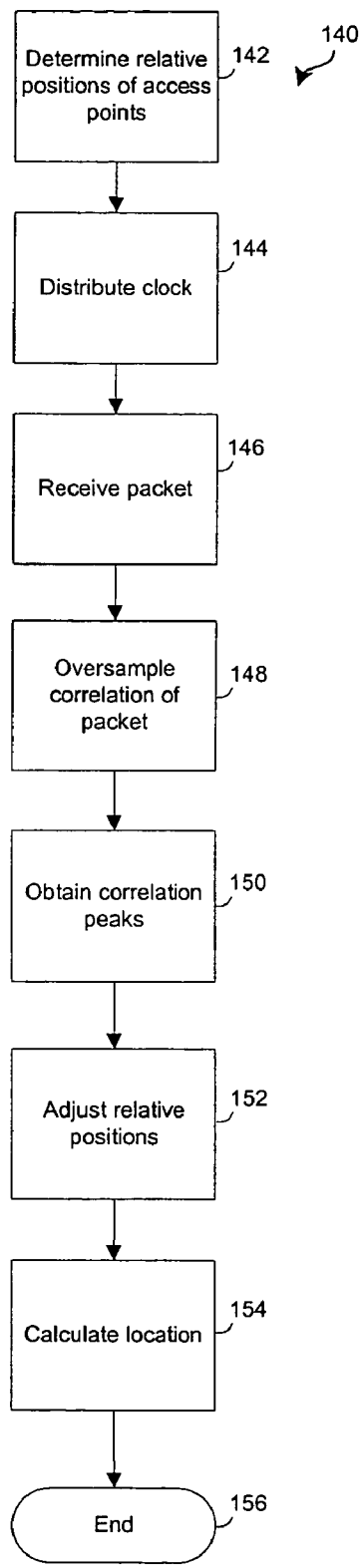
FIG. 6 is a flowchart illustrating the program flow of a method for determining location in a wireless network having at least three access points.

In view of the foregoing structural and functional features described above, methodologies in accordance with various aspects of the present invention will be better appreciated with reference to FIGS. 5 and 6. While, for purposes of simplicity of explanation, the methodologies of FIGS. 5 and 6 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. In addition, methodologies of the present invention can be implemented in software, hardware, or a combination of software and hardware.

Referring now to FIG. 5, a flowchart illustrating the program flow of a method 130 for synchronizing clocks in a wireless network is shown. The method 130 begins by determining the distance from a clock source for a first access point as shown in block 132. The distance from a clock source may be determined by any suitable method including, but not limited to, inputting the location of the access point, measurement, the use of a global positioning system, and the use of time domain reflectometry techniques. At block 134, a time synchronization packet having a time stamp indicative of a time is received by the access point. At block 136, a clock in the access point is adjusted based on the time synchronization packet and the distance from the clock source. The method then returns back to block 132 and the clocks of additional access points in the wireless network are similarly synchronized. Once all of the desired clocks in the network are synchronized, the method 130 ends in block 138.

Referring now to FIG. 6, a flowchart illustrating the program flow of a method 140 for determining location in a wireless network having at least three access points is shown. At block 142 the method determines the relative positions of at least three access points in the wireless network. The relative positions of the access points may also be determined by any suitable method including, but not limited to, inputting the locations of the access points, measurement, the use of a global positioning system, and the use of time domain reflectometry techniques. At block 144, a clock is distributed to the access points to synchronize clocking in the access points. At block 146, a packet is sent from a radio or client and received at each access point. Each access point oversamples a correlation of the packet in block 148, and obtains a respective correlation peak in block 150. At block 152, the relative positions of the access points are adjusted using the respective correlation peaks, the adjusted positions representing coplanar points. At block 154, the location of the client is calculated using the coplanar points and a time difference of arrival technique. The method 140 then ends in block 154.

By virtue of the foregoing, a precise time reference is distributed to network entities in a wireless network. Moreover, there is thus provided a system and method for accurately locating a client in a wireless network.

While the present system has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. It will be understood that the invention is applicable to any network using packeted data. Moreover, such a network makes use of a wide variety of cabling, some of which is unterminated and some of which is terminated. Further, the invention is not limited to any particular clock frequency and higher relative clock frequencies are used to provide additional client location accuracy. Therefore, the invention, in its broader aspects, is not limited to the specific details, the representative apparatus, and illustrative examples shown and described. Accordingly, departures may be made from such details without departing from the spirit or scope of the applicant's general inventive concept.

What is claimed is:

1. A method for determining location in a wireless network having at least three access points, comprising the steps of:
    determining the relative position of the at least three access points;
    distributing a clock to synchronize clocking in the at least three access points;
    receiving a packet at a first access point;
    oversampling a correlation of the packet;
    obtaining a first correlation peak; and
    adjusting the relative position of the first access point using the correlation peak to represent a first coplanar point.

2. The method for determining location in a wireless network having at least three access points of claim 1, further comprising the steps of:
    receiving a packet at a second access point;
    obtaining a second correlation peak; and
    adjusting the relative position of the second access point using the second correlation peak to represent a second coplanar point.

3. The method for determining location in a wireless network having at least three access points of claim 2, further comprising the steps of:
    receiving a packet at a third access point;
    obtaining a third correlation peak; and
    adjusting the relative position of the third access point using the third correlation peak to represent a third coplanar point.

4. The method for determining location in a wireless network having at least three access points of claim 3, further comprising the step of determining the equation of a circle using the three coplanar points, wherein the center of the circle corresponds to the location of the packet.

5. The method for determining location in a wireless network having at least three access points of claim 1, wherein the oversampling takes place at least 6 Megahertz (MHz).

6. A system for locating a client in a wireless network, comprising:
- at least three access points, each access point adapted to:
  - (i) wirelessly communicate with at least one client having a location using packeted data;
  - (ii) be placed in wired data communication within a selected data network; and
  - (iii) to share a common precise time reference using the selected data network;
- a switch adapted to translate the relative position of the at least three access points based on a shared common precise time reference and to calculate the location of the at least one client based on a transmission from the client;
- wherein the switch sends out a timing synchronization pulse packet, the packet is detected by each access point, and the detected packets are used to globally synchronize timing information across the network; and
- wherein the detected packets are oversampled to provide additional location accuracy by adjusting a relative position of a first of the at least three access points using a correlation peak obtained from oversampling.

7. The system for locating a client in a wireless network of claim 6, wherein the switch includes a precision time reference shared by the at least three access points.

8. The system for locating a client in a wireless local area network of claim 7, wherein the switch includes a respective physical interface card for each of the at least three access points, the precision time reference coupled to the physical interface cards, and the physical interface cards generating synchronization packets that are used by the at least three access points in sharing the common precise time reference.

9. The system for locating a client in a wireless network of claim 8, wherein each physical interface card includes time domain reflectometry circuitry capable of determining the distance to a respective access point.

10. The system for locating a client in a wireless network of claim 6, wherein time stamps are generated based on the oversampled detected packets.

11. The system for locating a client in a wireless network of claim 10, wherein the time stamps are used in the location calculation.

12. The system for locating a client in a wireless network of claim 6, wherein each of the at least three access points includes a precision clock and, wherein the precision clocks are synchronized via the wired data network.

13. The system for locating a client in a wireless network of claim 12, wherein the client transmits packeted data, the at least three access points receive and time stamp the packeted data, and the switch uses a time difference of arrival technique to calculate the location of the client based on the time stamps.

14. An apparatus for locating a client in a wireless network including at least three access points, comprising:
- means for determining the relative position of at least three access points;
- means for translating the relative position of the at least three access points, the means for translating the relative position further comprises means for oversampling a correlation of a packet received at a first of the at least three access points and means for obtaining a correlation peak;
- means for synchronizing clocking in the at least three access points;
- means for receiving a time of receipt of a client transmission from the least three access points; and
- means for calculating the location of the client based on the translated positions of the access points;
- wherein the means for translating uses a correlation peak obtained by the means for obtaining a correlation peak to represent a first coplanar point.

15. The apparatus for locating a client in a wireless network including at least three access points of claim 14, further comprising:
- means for generating a time synchronization pulse packet.

16. The apparatus for locating a client in a wireless network including at least three access points of claim 14, wherein the oversampling takes place at least 500 Megahertz (MHz).

17. The apparatus for locating a client in a wireless network including at least three access points of claim 14, wherein the correlation peak is used to synchronizing clocking in the at least three access points.

18. The apparatus for locating a client in a wireless network including at least three access points of claim 14, further comprising
- means for determining a distance to an access point.

19. The apparatus for locating a client in a wireless network including at least three access points of claim 14, wherein the distance to an access point is used in translating the relative position of the at least three access points.

20. The apparatus for locating a client in a wireless network including at least three access points of claim 14, wherein calculating the location of the client includes a time difference of arrival technique to calculate the location.

21. The apparatus for locating a client in a wireless network including at least three access points of claim 20, wherein time difference of arrival technique uses the equation of a circle and the center of the circle relates to the location of the client.

* * * * *